(12) United States Patent
Leng

(10) Patent No.: US 11,835,114 B1
(45) Date of Patent: Dec. 5, 2023

(54) DRIVING MECHANISM CAPABLE OF MOVING BACK AND FORTH QUICKLY

(71) Applicant: Xingyu Leng, Jiangxi (CN)

(72) Inventor: Xingyu Leng, Jiangxi (CN)

( * ) Notice: Subject to any disclaimer, the term of this patent is extended or adjusted under 35 U.S.C. 154(b) by 0 days.

(21) Appl. No.: 18/163,205

(22) Filed: Feb. 1, 2023

(30) Foreign Application Priority Data

Sep. 20, 2022 (CN) .......................... 202222492100.3

(51) Int. Cl.
*F16H 25/12* (2006.01)
*A61H 23/02* (2006.01)

(52) U.S. Cl.
CPC ......... *F16H 25/12* (2013.01); *A61H 23/0254* (2013.01)

(58) Field of Classification Search
CPC .............................. F16H 25/12; A61H 23/0254
USPC .............................................................. 74/57
See application file for complete search history.

(56) References Cited

U.S. PATENT DOCUMENTS

| | | | | |
|---|---|---|---|---|
| 1,142,641 A * | 6/1915 | Temple | ................... | F16H 25/12 74/57 |
| 2,436,692 A * | 2/1948 | Greene | ................ | B23D 49/162 144/35.2 |
| 3,451,277 A * | 6/1969 | Kieronski | ............... | F16H 53/08 74/57 |
| 3,980,252 A * | 9/1976 | Tae | ..................... | B65H 54/2812 242/397.3 |
| 4,597,302 A * | 7/1986 | McLendon, Jr. | ......... | F01B 3/02 74/57 |
| 5,904,065 A * | 5/1999 | Koller | ..................... | F16H 25/12 74/53 |
| 6,902,525 B1 * | 6/2005 | Jewell | .................... | A61H 19/44 600/38 |

FOREIGN PATENT DOCUMENTS

| | | |
|---|---|---|
| CN | 112691018 A | 4/2021 |
| CN | 215652496 U | 1/2022 |

\* cited by examiner

*Primary Examiner* — Jake Cook

(57) ABSTRACT

A driving mechanism capable of moving back and forth quickly, including a rotary motor and a guide frame, wherein the rotary motor is connected to a rotary member, a helical guide groove is formed in an outer wall of the rotary member, the guide frame is installed above the rotary motor, the guide frame is slidingly installed with a slider in a vertical direction, a drive member is disposed on an inner wall of the slider, the drive member can slide along a length direction of the guide groove, and drive the slider to move back and forth in a vertical direction.

9 Claims, 6 Drawing Sheets

DRIVING MECHANISM CAPABLE OF MOVING BACK AND FORTH QUICKLY

TECHNICAL FIELD

The present disclosure relates to the technical field of motors capable of moving back and forth, in particular to a driving mechanism capable of moving back and forth quickly.

BACKGROUND

An existing reciprocating movement structure generally implements the reciprocating movement of a slider through the cooperation of a drive member screw, a screw nut and a rotary motor. However, for the slider, the reciprocating movement needs to be implemented through positive and negative rotation of a motor, therefore its reciprocating frequency is higher, the motor is also easy to be damaged, and at the same time its journey is longer.

Of course, the reciprocating movement is also implemented through a stretching motor, the stretching motor generally implements the reciprocating movement of the slider through a cam structure, but its reciprocating movement frequency has a limitation, and the movement journey is also shorter.

For example, the patent application CN202110013742.8 discloses a massaging head component and a fascial gun, the adopted driving component includes a piston and an electric connector, the electric connector is disposed on the piston, a connecting portion is detachably connected to the piston, an electric connecting member and the electric connector form a separating electric connection, and the electric connector and a power supply component form a stretching electric connection. The reciprocating movement of the slider is implemented through a piston structure, but this structure has a shorter journey.

At the same time, the structure is also not conducive to the application on adult products. For example, the existing adult products generally implement the stretching movement by adopting a crank structure, however the stretching structure has problems of a shorter stretching distance and a slower stretching reciprocating frequency, and when the stretching frequency is increased, a stuck problem is easy to occur, with unsmooth stretching.

SUMMARY

The main purpose of the present disclosure is to provide a driving mechanism capable of moving back and forth quickly, the present disclosure aims at improving a reciprocating movement frequency of a bearing base by improving a reciprocating movement structure, and the reciprocating movement is stable, without a stuck problem.

In order to implement the above purpose, the present disclosure provides a driving mechanism capable of moving back and forth quickly, including:

a rotary motor, which is connected to a rotary member, the rotary member is a long column shape, and a helical guide groove is formed in an outer wall of the rotary member;

a guide frame, which is installed above the rotary motor, the guide frame is slidingly installed with a slider in a vertical direction, a drive member is disposed on an inner wall of the slider, and the drive member partially extends into the guide groove and can slide along a length direction of the guide groove so as to drive the slider to move back and forth in the vertical direction.

Preferably, a gearbox is disposed between the rotary motor and the rotary member, and the guide groove is formed by two symmetrically arranged arc-shaped grooves.

Preferably, the slider is provided with a half groove, the drive member is a ball capable of rotating, and the ball may be partially stuck in the half groove.

Preferably, the slider is provided with the half groove, the drive member is a fixedly arranged spheroid, and an outer wall of the spheroid partially extends into the guide groove.

Preferably, a rotary hole is formed in the slider, the drive member includes a rotary shaft, which is arranged in the rotary hole and extends with a fixed pin, and the fixed pin fits the guide groove and can move along an outer wall of the guide groove.

Preferably, the guide frame is provided with a plurality of locating rods, a limiting groove is enclosed between two locating rods, the slider is provided with a raised limiting portion at a position of the limiting groove, and two sides of the limiting portion may abut the locating rods; and the limiting portion is provided with the half groove, and the half groove is provided with a detachable cover body.

Preferably, a pivot hole is formed in a middle of an upper end of the guide frame, and a pivot portion fitting with the pivot hole is disposed on the rotary member.

Preferably, a rotary interval is enclosed in a middle of the guide frame, and the rotary member fits with an inner wall of the guide frame.

Preferably, a height between an upper end and a lower end of the arc-shaped groove is equal to a sliding distance of the slider, and an inner wall of the slider is a hexagonal shape.

Preferably, the rotary member, the guide frame and the slider are respectively made of ABS materials.

In the technical solution of the present disclosure, the rotary motor rotates and drives the rotary member to rotate along an axis in a manner that the rotary member and the slider are respectively provided with the guide groove and the drive member, and at the same time the drive member is always in the vertical direction. Therefore, the drive member ascends or descends under the drive of the guide groove, so as to drive the slider to move back and forth along the guide frame in the vertical direction, turning of the slider in upper and lower directions is implemented through the guide groove in closed-loop setting, and the service life of the rotary motor is effectively improved. The slider may be connected to a corresponding massaging head or an elastic coating member, so as to implement the reciprocating movement. Silicon or elastic materials may be coated on the outer wall of the slider, and when applied in the adult products, this structure may improve the reciprocating frequency effectively and improve the experience feeling without a stuck problem.

Figure 1:
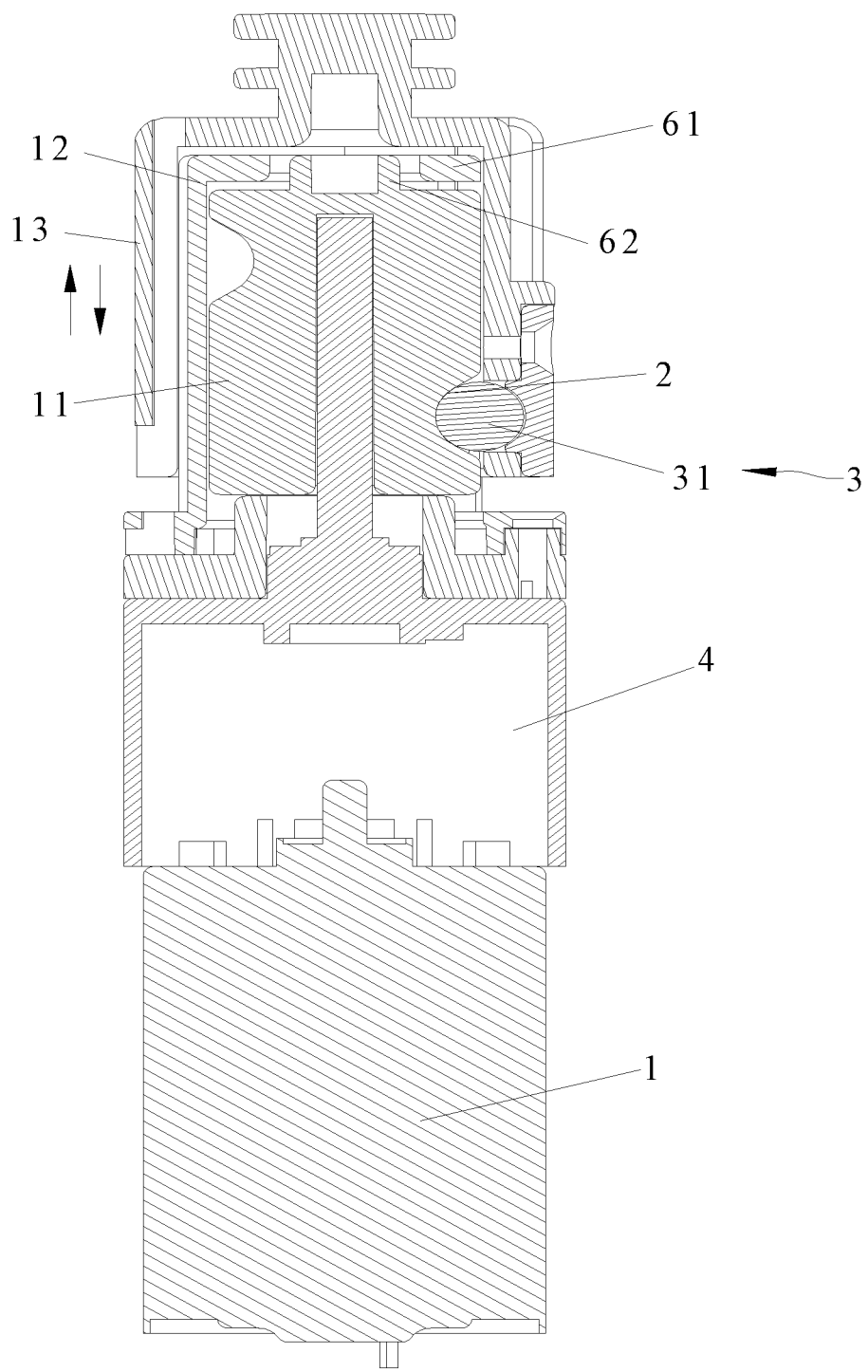
FIG. 1 is a first section view of the present disclosure.
Figure 2:
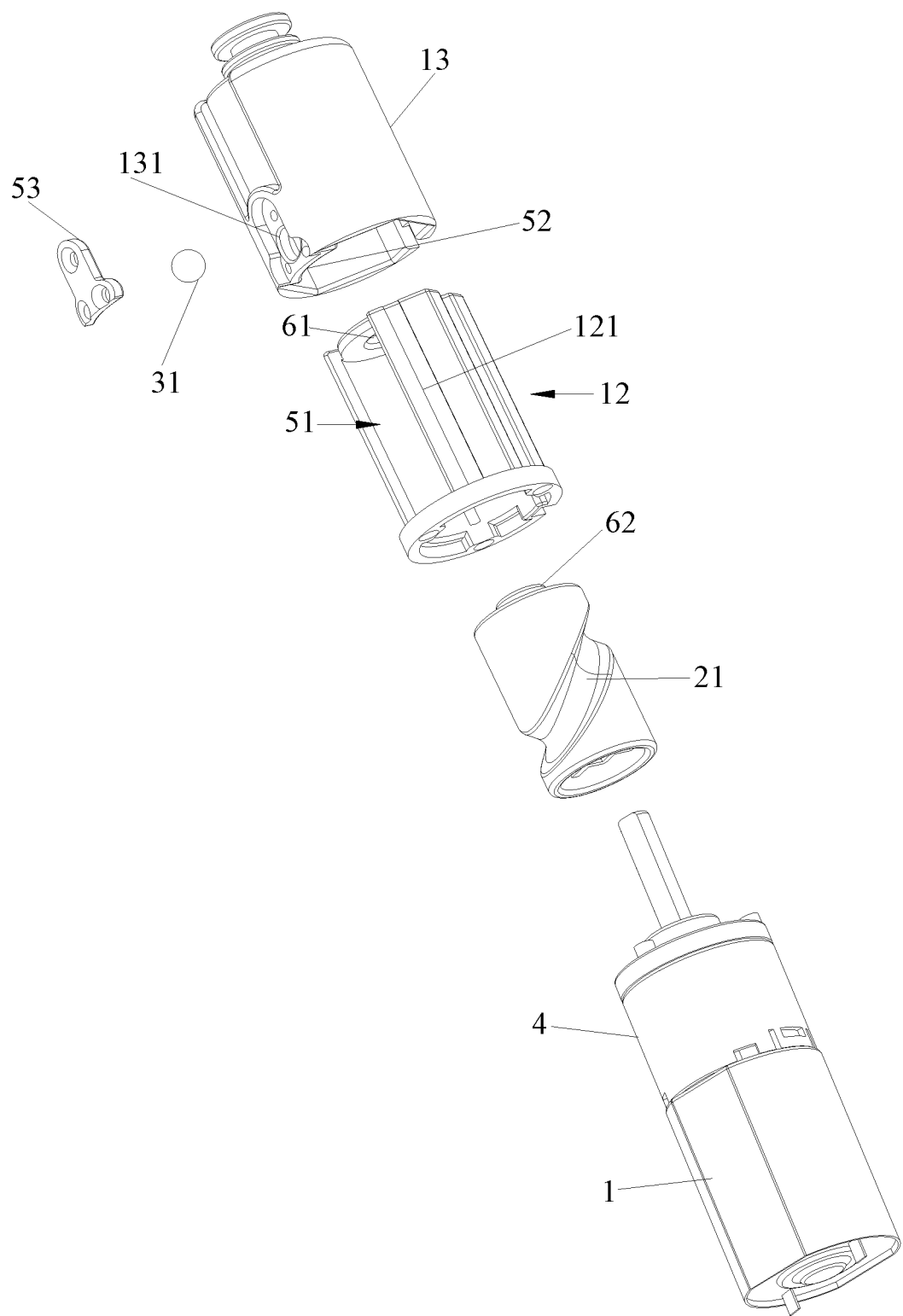
FIG. 2 is a first exploded view of the present disclosure.
Figure 3:
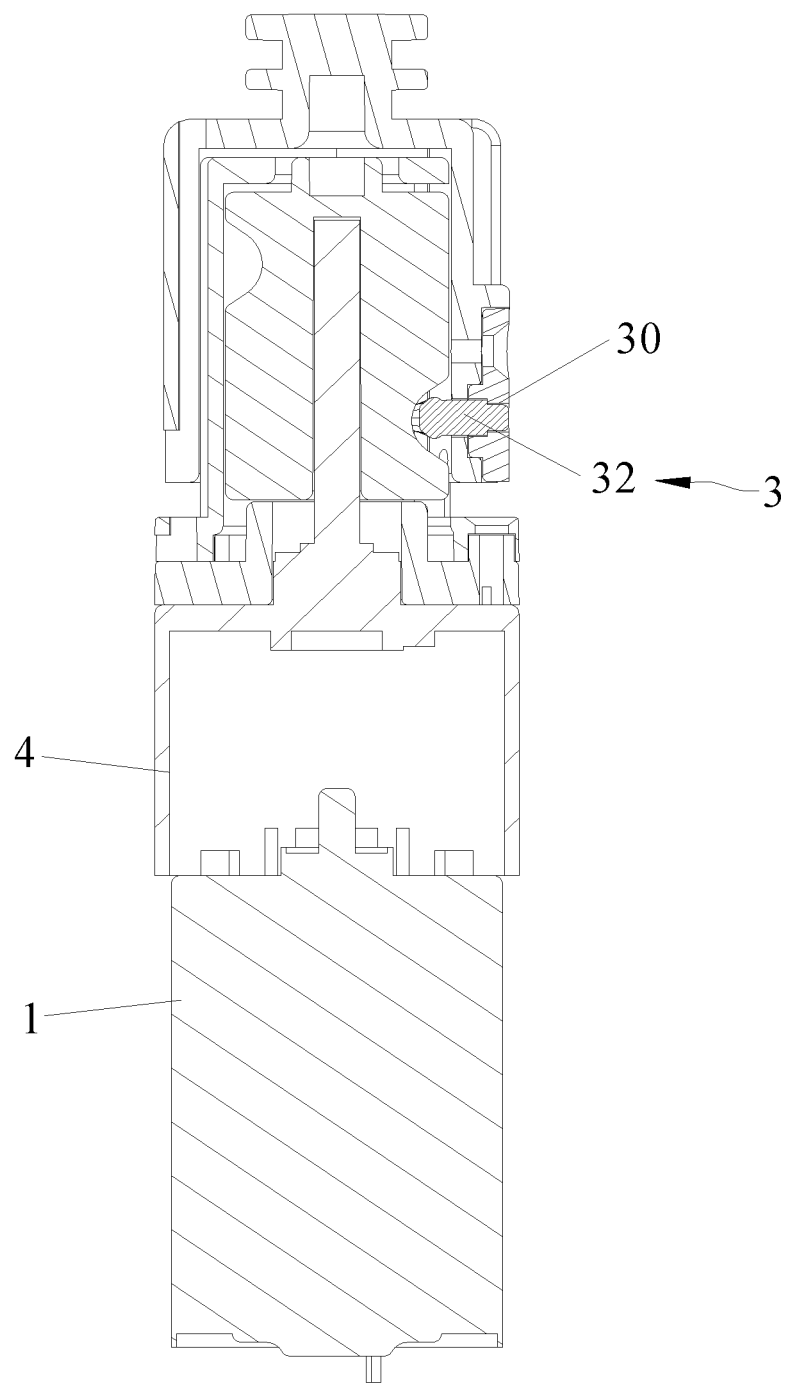
FIG. 3 is a second section view of the present disclosure.

In the drawing: 1—rotary motor, 11—rotary member, 12—guide frame, 121—locating rod, 13—slider, 131—half groove, 2—guide groove, 21—arc-shaped groove, 3—drive member, 31—ball, 32—fixed pin, 4—gearbox, 51—limiting groove, 52—limiting portion, 53—cover body, 61—pivot hole, 62—pivot portion.

DETAILED DESCRIPTION OF THE EMBODIMENTS

The technical solutions in the embodiments of the present disclosure are clearly and completely elaborated below in combination with the drawings. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

It is to be noted that if directional indication (such as: upper, lower, left, right, front, rear, top, bottom, inner, outer, vertical direction, horizontal, longitudinal, anticlockwise, clockwise, circumferential, radial, axial, etc.) is involved in the embodiments of the present disclosure, the directional indication is merely used to explain the relative position relation, movement and the like of various components under a certain special posture (as shown in the drawings); and if the special posture is changed, the directional indication will change accordingly.

In addition, if the descriptions "first" or "second" are involved in the embodiments of the present disclosure, the descriptions "first" or "second" are merely used for description, instead of being understood as indicating or implying relative importance or impliedly indicating the quantity of the showed technical features. Thus, the features defined with "first" and "second" may expressly or impliedly one or more features. Thus, the technical solutions of various embodiments may be mutually combined, but must be achieved by those of ordinary skill in the art. When the combination of the technical solution has mutual contradiction or cannot be achieved, it should believe that such combination of the technical solution does not exist and does not fall in the protection range required by the present disclosure.

As shown in FIG. 1 to FIG. 6, a driving mechanism capable of moving back and forth quickly includes:
 a rotary motor 1, which is connected to a rotary member 11, the rotary member 11 is a long column shape, and a helical guide groove 2 is formed in an outer wall of the rotary member 11;
 a guide frame 12, which is installed above the rotary motor 1, the guide frame 12 is slidingly installed with a slider 13 in a vertical direction, a drive member 3 is disposed on an inner wall of the slider 13, and the drive member 3 may slide along a length direction of the guide groove 2 and drive the slider 13 to move back and forth in the vertical direction.

The rotary motor 1 rotates and drives the rotary member 11 to rotate along an axis in a manner that the rotary member 11 and the slider 13 are respectively provided with the guide groove 2 and the drive member 3, and at the same time the drive member 3 is always in the vertical direction. Therefore, the drive member 3 ascends or descends under the drive of the guide groove 2, so as to drive the slider 13 to move back and forth along the guide frame 12 in the vertical direction, and turning of the slider 13 in upper and lower directions is implemented through the guide groove 2 in closed-loop setting, so as to improve the service life of the rotary motor 1 effectively.

In embodiments of the present disclosure, a gearbox 4 is disposed between the rotary motor 1 and the rotary member 11. By setting a gear set in the gearbox 4, the abrasion of the rotary motor 1 is effectively reduced, and the service life is improved.

In embodiments of the present disclosure, the guide groove 2 is enclosed by two symmetrically arranged arc-shaped grooves 21.

In a first embodiment of the present disclosure, the slider 13 is provided with a half groove 131, the drive member 3 may be a rotary ball 31, which may be partially stuck in the half groove 131; when the rotary motor 1 rotates, the guide groove 2 enables the ball 31 to move and drive the slider 13 to move, and the guide groove 2 is a helical structure. Therefore, the ascending and descending of the ball 31 are also implemented when moving along a helical direction, thereby implementing the smooth reciprocating of the slider 13.

In a second embodiment of the present disclosure, the slider 13 is provided with the half groove 131, the drive member 3 is a fixedly arranged spheroid, and an outer wall of the spheroid partially extends into the guide groove 2. In another embodiment, the drive member 3 may also be a fixedly arranged ball 31, correspondingly, the effect of the fixedly arranged ball 31 is worse than that of the rotationally arranged ball 31, but the reciprocating of the slider 13 may be ensured.

Figure 4:
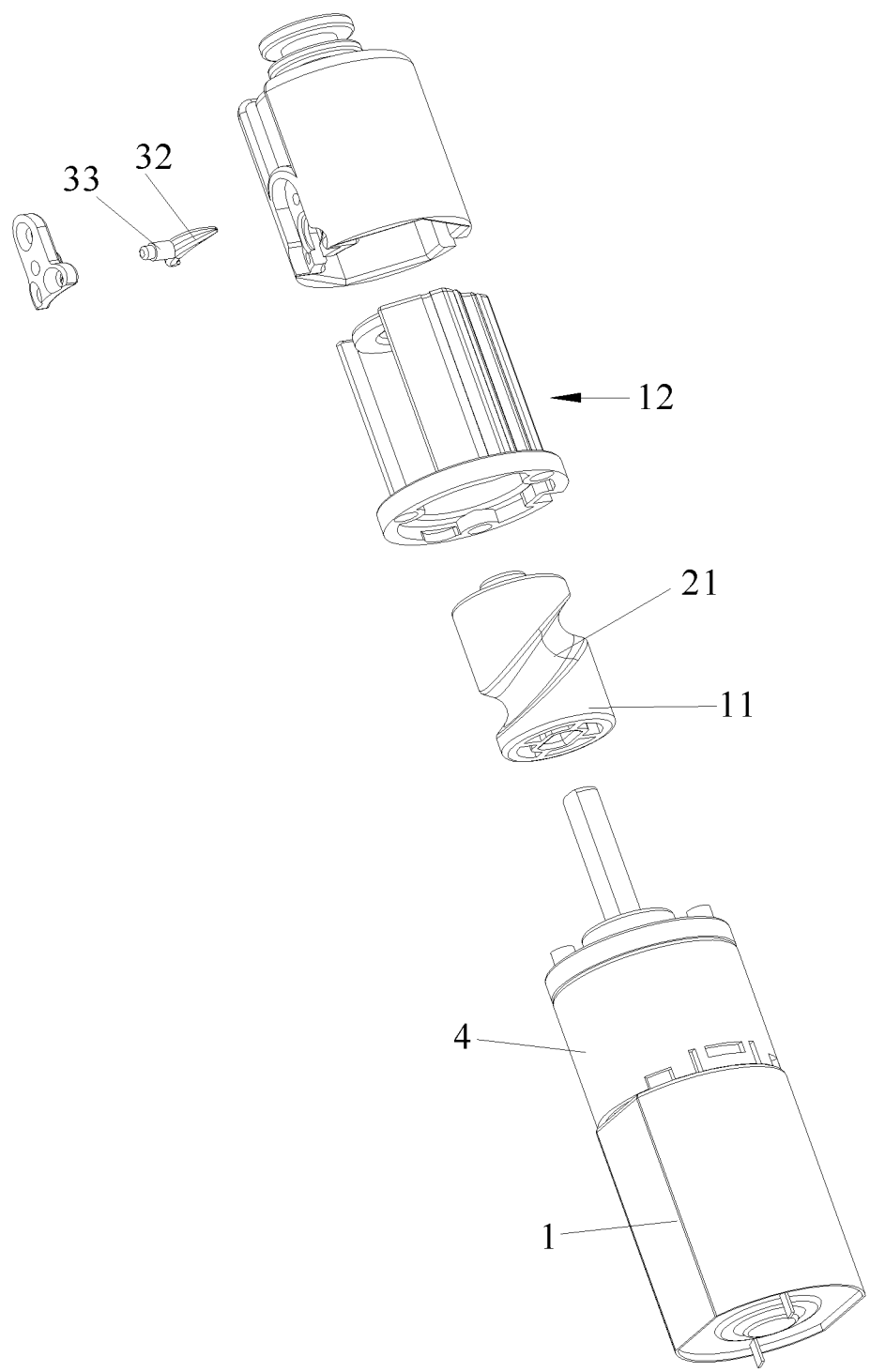
FIG. 4 is a second exploded view of the present disclosure.
Figure 5:
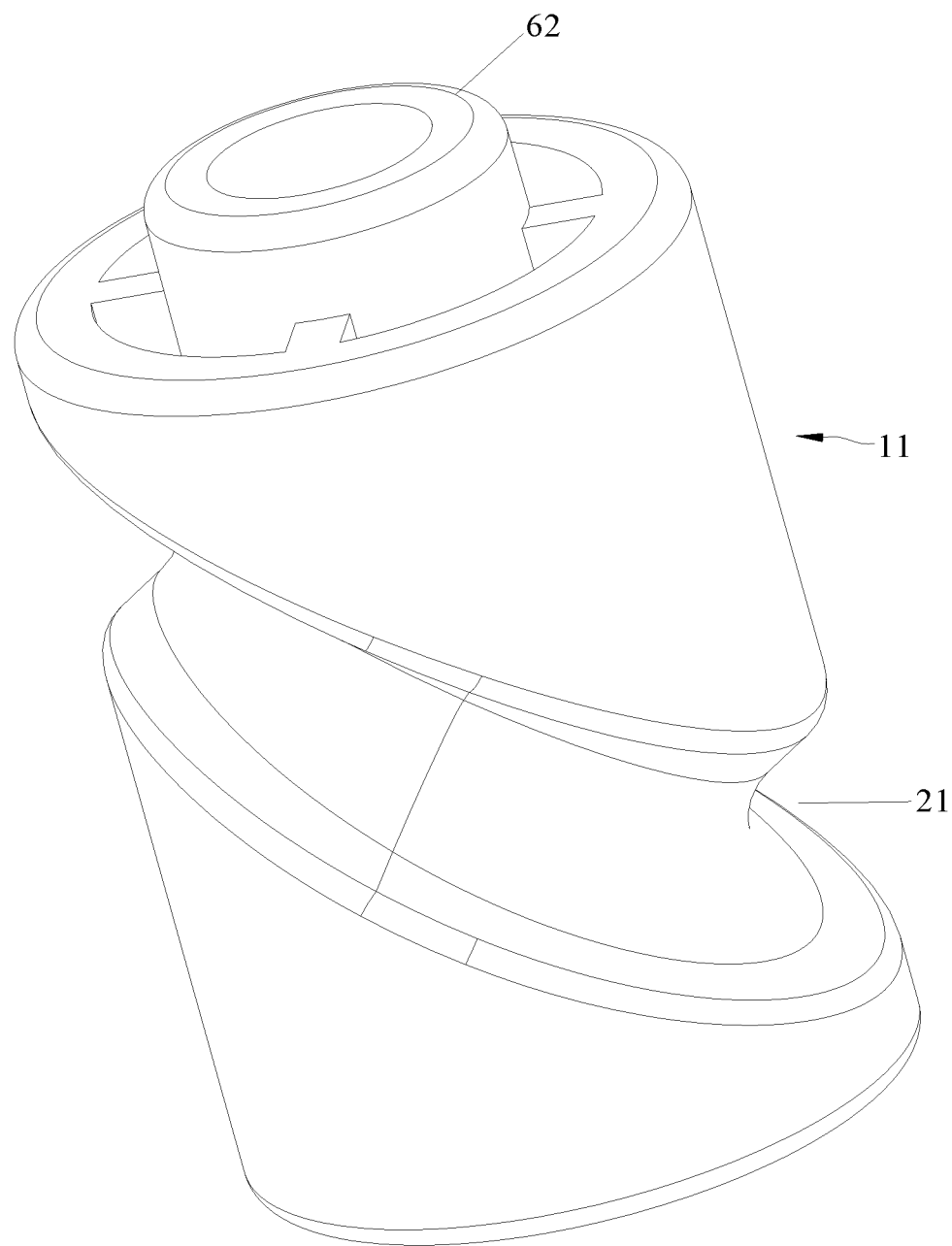
FIG. 5 is a solid schematic diagram of a rotary member.
Figure 6:
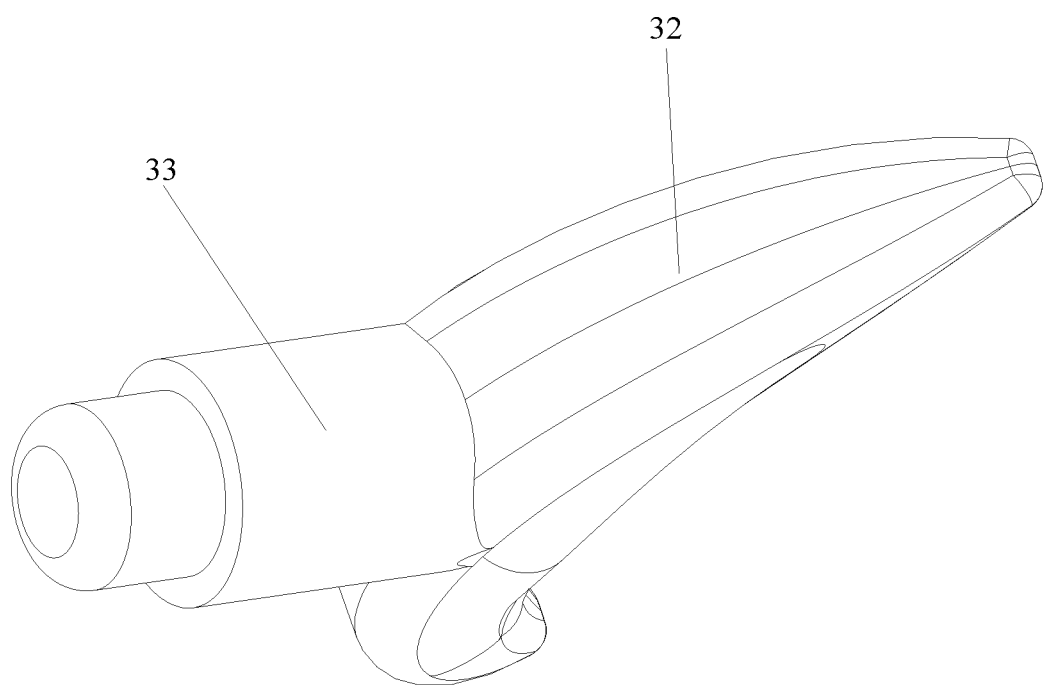
FIG. 6 is a solid schematic diagram of a locking pin.

In a third embodiment of the present disclosure, a rotary hole 30 is formed in the slider 13, the drive member 3 includes a rotary shaft 33, which is arranged in the rotary hole 30, and a fixed pin 32 extends to a front end of the rotary shaft 33. The fixed pin 32 may be a long column shape, a spherical shape or an arc shape (crescent shape) as shown in FIG. 4, the fixed pin 32 fits the guide groove 2 and may move along an outer wall of the guide groove 2, and the cooperation of the guide groove 2 and the drive member 3 may be also implemented through the rotationally arranged drive member 3 and the setting of the fixed pin 32, thereby implementing the reciprocating movement.

In embodiments of the present disclosure, the guide frame 12 is provided with a plurality of locating rods 121, a limiting groove 51 is enclosed between two locating rods 121, the slider 13 is provided with a raised limiting portion 52 at a position of the limiting groove 51, and two sides of the limiting portion 52 may abut the locating rods 121, so as to implement the limitation and guide for the slider 13.

In embodiments of the present disclosure, the limiting portion 52 is provided with the half groove 131, which is provided with a detachable cover body 53. The installation of the slider 13 is convenient through the setting of the cover body 53 and the limiting portion 52. For example, the slider 13 is firstly installed on the guide frame 12, and then the guide groove 2 is relative to the half groove 131, the drive member 3 is installed, and finally, the cover body 53 is fixed, namely, the installation is completed.

In embodiments of the present disclosure, a pivot hole 61 is formed in a middle of an upper end of the guide frame 12, and a pivot portion 62 fitting with the pivot hole 61 is disposed on the rotary member 11. The cooperation of the pivot portion 62 and the pivot hole 61 ensures that the rotary member 11 is coaxial with the rotary motor 1, so as to avoid the eccentricity of the rotary member 11 due to the stuck.

In embodiments of the present disclosure, a rotary interval is enclosed in a middle of the guide frame 12, and the rotary member 11 fits with the inner wall of the guide frame 12. Further, the rotary member 11 is limited and guided so as to avoid the eccentricity of the rotary member 11.

In embodiments of the present disclosure, a height between an upper end and a lower end of the arc-shaped groove 21 is equal to a sliding distance of the slider 13, and an inner wall of the slider 13 is a hexagonal shape, so as to guide the slider 13.

In embodiments of the present disclosure, the rotary member 11, the guide frame 12 and the slider 13 are respectively made of ABS materials, so that the whole weight of the product is lighter, and the reciprocating movement frequency is higher. The structure is more exquisite, with a better stability.

The above is the preferred embodiment of the present disclosure, instead of limiting the patent scope of the present disclosure. Without departing from the concept of the present disclosure, the equal structural transformations made according to the contents of the specification and the drawings or direct/indirect application in other related technical fields fall within the scope of protection of the present disclosure.

What is claimed is:

1. A driving mechanism capable of moving back and forth, comprising:
    a rotary motor, which is connected to a rotary member, a helical guide groove is formed in an outer wall of the rotary member, and the guide groove is a closed-loop curve; and
    a guide frame, which is installed above the rotary motor, the guide frame is slidingly installed with a slider in a vertical direction, a drive member is disposed on an inner wall of the slider, and the drive member partially extends into the guide groove and is capable of sliding along a length direction of the guide groove so as to drive the slider to move back and forth in the vertical direction;
    wherein a pivot hole is formed in a middle of an upper end of the guide frame, and a pivot portion fitting with the pivot hole is disposed on the rotary member.

2. The driving mechanism capable of moving back and forth according to claim 1, wherein a gearbox is disposed between the rotary motor and the rotary member.

3. The driving mechanism capable of moving back and forth according to claim 1, wherein the slider is provided with a half groove, the drive member is a ball capable of rotating, and the ball is partially stuck in the half groove.

4. The driving mechanism capable of moving back and forth according to claim 3, wherein the slider is provided with the half groove, the drive member is a fixedly arranged spheroid, and an outer wall of the spheroid partially extends into the guide groove.

5. The driving mechanism capable of moving back and forth according to claim 1, wherein a rotary hole is formed in the slider, the drive member comprises a rotary shaft, which is arranged in the rotary hole; a fixed pin is provided on a front end of the rotary shaft, and the fixed pin fits the guide groove and is capable of moving along an outer wall of the guide groove.

6. The driving mechanism capable of moving back and forth according to claim 4, wherein the guide frame is provided with a plurality of locating rods, a limiting groove is enclosed between two adjacent locating rods, the slider is provided with a raised limiting portion at a position of the limiting groove, and two sides of the limiting portion abut the two adjacent locating rods; and the limiting portion is provided with the half groove, and the half groove is provided with a detachable cover body.

7. The driving mechanism capable of moving back and forth according to claim 1, wherein the rotary member fits with an inner wall of the guide frame.

8. The driving mechanism capable of moving back and forth according to claim 2, wherein a height between an upper end and a lower end of the arc-shaped groove is equal to a sliding distance of the slider, and the inner wall of the slider is a hexagonal shape.

9. The driving mechanism capable of moving back and forth according to claim 1, wherein the rotary member, the guide frame and the slider are respectively made of ABS materials.

* * * * *